(12) United States Patent
Brown

(10) Patent No.: US 8,739,374 B2
(45) Date of Patent: Jun. 3, 2014

(54) AERIAL DISPOSAL AND DISPERSAL OF CREMATED REMAINS GOING OUT WITH A BANG

(71) Applicant: Wallace N. Brown, Maricopa, AZ (US)

(72) Inventor: Wallace N. Brown, Maricopa, AZ (US)

(*) Notice: Subject to any disclaimer, the term of this patent is extended or adjusted under 35 U.S.C. 154(b) by 0 days.

(21) Appl. No.: 13/752,244

(22) Filed: Jan. 28, 2013

(65) Prior Publication Data

US 2014/0041169 A1     Feb. 13, 2014

Related U.S. Application Data

(60) Provisional application No. 61/680,596, filed on Aug. 7, 2012.

(51) Int. Cl.
*A61G 17/00*     (2006.01)

(52) U.S. Cl.
USPC .............................................................. 27/1

(58) Field of Classification Search
USPC .......................... 27/1; 102/282, 356, 357, 202
See application file for complete search history.

(56) References Cited

U.S. PATENT DOCUMENTS

| | | | | |
|---|---|---|---|---|
| 3,730,093 | A | * 5/1973 | Cummings | 102/363 |
| 4,877,203 | A | * 10/1989 | Harden | 244/136 |
| 5,005,784 | A | 4/1991 | Harden | |
| 5,339,741 | A | * 8/1994 | Craven et al. | 102/361 |
| 5,564,260 | A | 10/1996 | West et al. | |
| 5,739,462 | A | * 4/1998 | Poor et al. | 102/342 |
| 6,550,114 | B1 | 4/2003 | Reece | |
| 8,074,329 | B2 | * 12/2011 | Roberts | 27/1 |
| 2011/0220733 | A1 | * 9/2011 | Larson et al. | 239/10 |

* cited by examiner

*Primary Examiner* — William Miller

(57) ABSTRACT

An aerial disposal and dispersal of cremated remains device is presented. It is used to spread the remains of loved ones over a desired area. The device comprises a canister and a mortar, the canister being cylindrical in shape having cardboard walls, the canister further containing an igniter and burster charge in an inner cardboard tube, such inner tube being fitted with an upper cap, the mortar being cylindrical in shape with steel walls, the mortar further comprising a lifting charge which sits below an obturator disc, the obturator disc having a hole in the center, the canister fitting inside the mortar such that the canister's igniter sits atop the hole in the obturator disc. At least one device is fitted to a horizontal member to launch remains from any location.

9 Claims, 3 Drawing Sheets

AERIAL DISPOSAL AND DISPERSAL OF CREMATED REMAINS GOING OUT WITH A BANG

CROSS-REFERENCE TO RELATED APPLICATIONS

The present application claims priority under 35 USC 119 (e) (1) from U.S. Provisional Patent Application Ser. No. 61/689,596, filed Jun. 6, 2012, for Aerial Disposal and Dispersal of Cremated Remains, "Going Out with a Bang", of common inventorship.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention pertains to the field of disposition of cremated ashes, and more specifically to the field of dispersing cremated ashes.

BACKGROUND OF THE INVENTION

A guarantee of death is one thing in life that all people hold in common, whether a result of a long term illness or a sudden unexpected passing. The most typical reaction to a death of a loved one is to celebrate and honor their life with a wake or funeral. Funerals and memorial services gather family members and friends together to reminisce, provide an outlet for people to express their love and fond memories of the departed loved one, and bring a sense of closure for those loved ones who are left behind. The remains of the departed one are either buried or cremated, according to individual or familial preference. While burials probably will always be performed, cemeteries are becoming crowded and burial cost is skyrocketing. More and more people are turning to cremation as an affordable, practical and environmentally friendly alternative to internment. Increasingly embraced by people from all walks of life and all religious backgrounds, the number of cremations performed each year is steadily increasing with cremation accounting for approximately thirty six percent of funeral services, and these numbers are expected to rise in coming years. After a body is cremated, surviving family member determine how cremated remains are handled. Many families have ashes interred at local cemeteries or mausoleums, but the cost of doing so is rather expensive. Requiring purchase of a dedicated funeral plot, housing remains in this manner is impractical for consumers who must adhere to a strict budget. While others opt to scatter a loved one's ashes beneath a favorite tree, a garden or at sea, releasing remains in this fashion presents challenges. The slightest wind makes carefully emptying an urn of ashen remains extremely difficult to complete. The prior art has put forth several designs for dispersing cremated ashes including the following references.

U.S. Pat. No. 6,550,114 to John L. Reece describes a method for cremating human remains by launching the remains into the upper atmosphere or beyond to cause the remains to combust through heat generated during atmospheric reentry.

U.S. Pat. No. 5,564,260 to Joan B. West and Clyde E. West describes methods for preparing, transporting and dispersing cremated remains with a balloon, and a container providing a clean environment for carrying out this method. Cremated remains are deposited into a balloon which is filled with gas, transported to a launching site and released. To provide an environment that assures substantially complete and safe transfer of the cremated remains to the balloon as well as to provide a sealed chamber for inflation and transport of the balloon, a special container having interior surfaces of vinyl or other barrier materials is used.

U.S. Pat. No. 5,005,784 to Bonnie J. Harden describes methods and various embodiments of an apparatus to address the dispersal of cremated remains. The methods involve steps which avoid any tendency to retain cremated remains within a container, steps which assure dispersal of cremated remains in only one desired direction, and steps which assure continuous and complete dispersal of all cremated remains. The invention also presents several embodiments including both a fabric bag and a mechanical apparatus for dispersing cremated remains. The disclosure addresses the utilization of existing air currents, the application of the invention to aerial dispersion, and designs which address simplicity of operation and manufacture. A fabric apparatus is disclosed which includes both an outer shell and an inner liner and a flap to seal the apparatus. The fabric apparatus presented may be rolled and transported by means of a handle. The mechanical apparatus presented discloses a sealed container having a hinged door.

None of these prior art references describe the present invention.

SUMMARY OF THE INVENTION

It is an object of the present invention to provide a practical and affordable device to disperse cremated remains in a special and honorary manner. A mortar with an inner canister is presented. One or more mortars may are attached to a horizontal member that can be transported to a desired location for dispersal of cremated remains.

It is a further object of the present invention to provide a practical and affordable device to disperse cremated remains in a special and honorary manner comprising a mortar for receiving the remains, wherein the mortar is mounted onto a platform suitable for mounting onto the bed of a truck, for portability of the mortar.

It is a further object of the present invention to provide a device to disperse cremated remains of a human or an animal.

DETAILED DESCRIPTION OF THE INVENTION

The present invention, the Aerial Disposal and Dispersal of Cremated Remains, is a device through which cremated human remains are launched and exploded high in the sky, dispersing particulate remnants over an expansive area. Design intent is to provide consumers with a cost effective alternative to interring cremated remains in cemeteries and mausoleums while providing a peace of mind in knowing a loved one is always around and near their survivors. Aerial Disposal and Dispersal of Cremated Remains follows environmental regulations and other restrictions regarding disposal of human remains.

Figure 1:
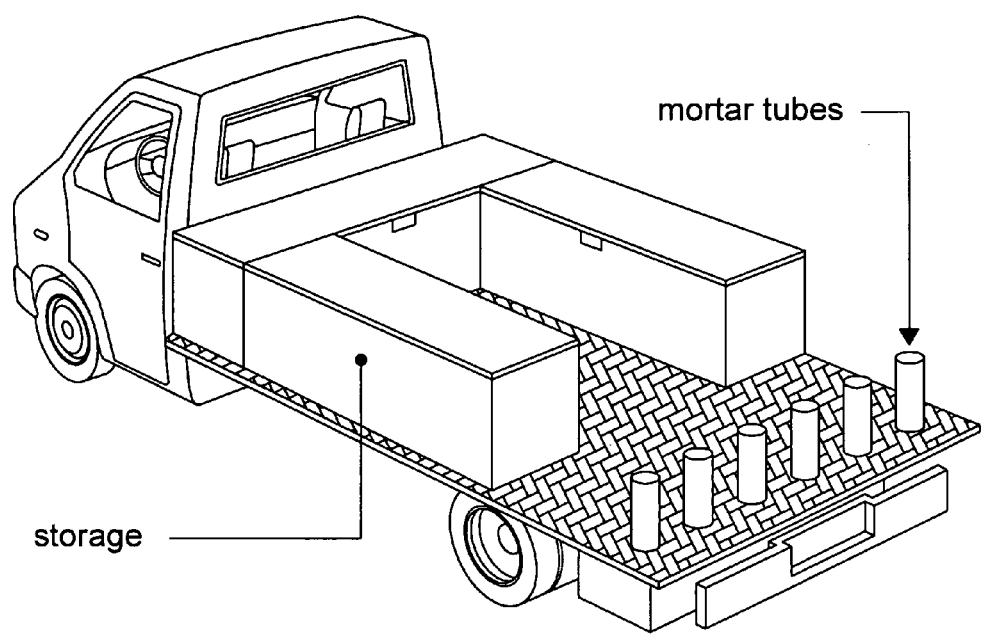
FIG. 1 is a perspective view of the launching device here mounted to a truck bed.

The aerial disposal and dispersal of cremated remains device, is a mobile launch station that may be secured on a flatbed truck or the bed of a one half ton pickup truck, as shown in FIG. 1, and transported to a specific area to disperse remains over designated land or bodies of water. The aerial disposal and dispersal of cremated remains device is comprised of tubular-shaped mortars, FIG. 1, manufactured of heavy duty heat resistant steel. These mortars are mounted to a ten or twelve gauge metal floor plate [2]. The underside of the plate incorporates a nonskid rubber material (not shown). This plate having mortars mounted thereon can be placed on any appropriate surface. In this FIG. 1 embodiment, six mortars are mounted on the plate, positioned such apart from one another, and the plate is mounted in the bed of truck, for example. As with other types of explosive mortars such as those utilized for aerial firework displays, the aerial disposal and dispersal of cremated remains device is packed with an explosive powder or comparable mechanism which propels cremated remains into the sky. The cremated remains are packaged in a sturdy biodegradable canister, described in detail below, together with an explosive device and fuse. Alternately, the explosive device and fuse may be attached to the container. The explosive device is designed to ignite the remains when a designated altitude is reached such that after launch the remains travel hundreds of feet into the air and then explode, dispersing the ash over an expansive area. The explosive device can be any known rocket or bomb suitable for use in the invention. A rocket can be used when less noise is desired. A bomb can be used when a report is desired.

Figure 2:
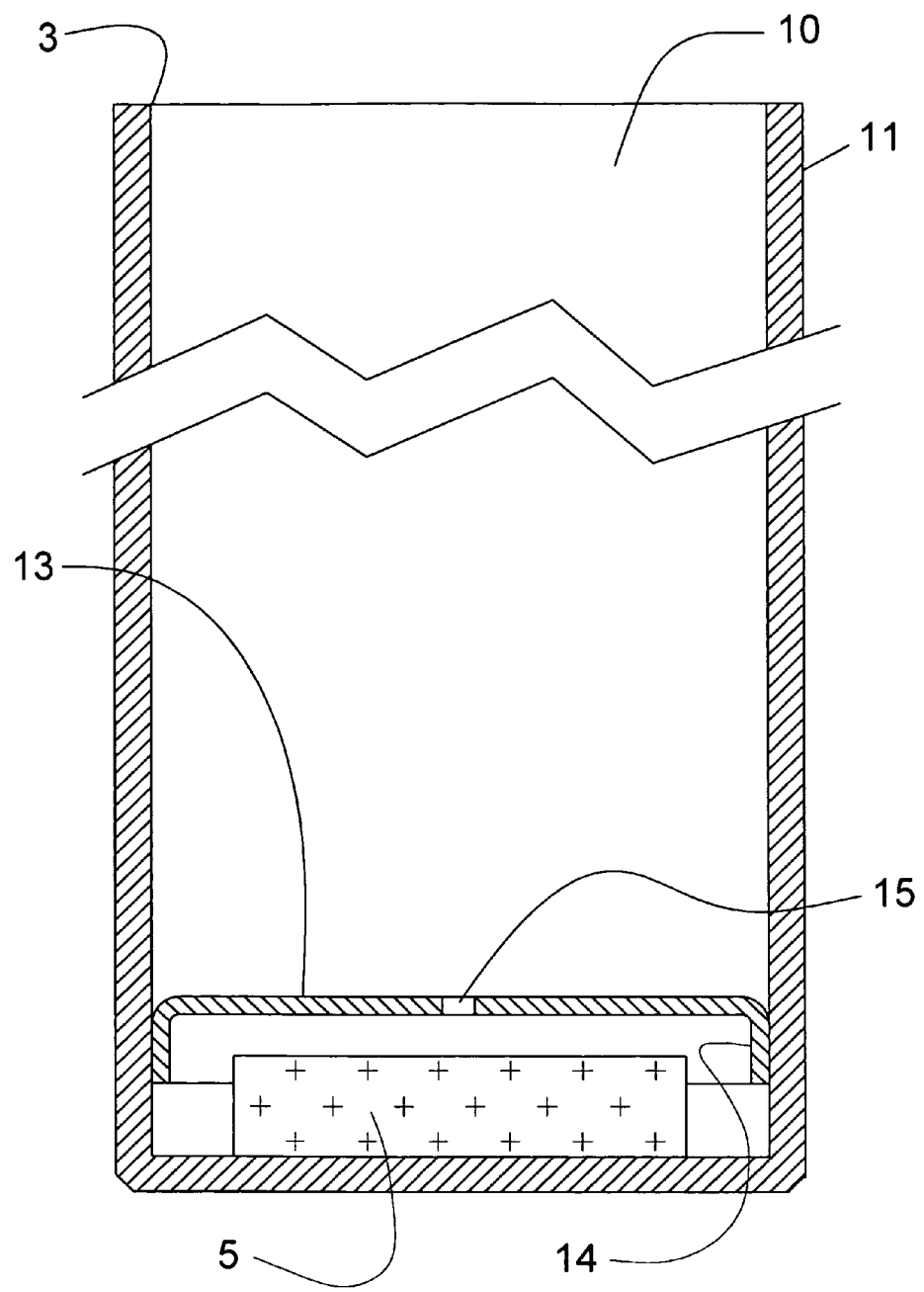
FIG. 2 is a drawing of the design for the mortar launch tube.
Figure 3:
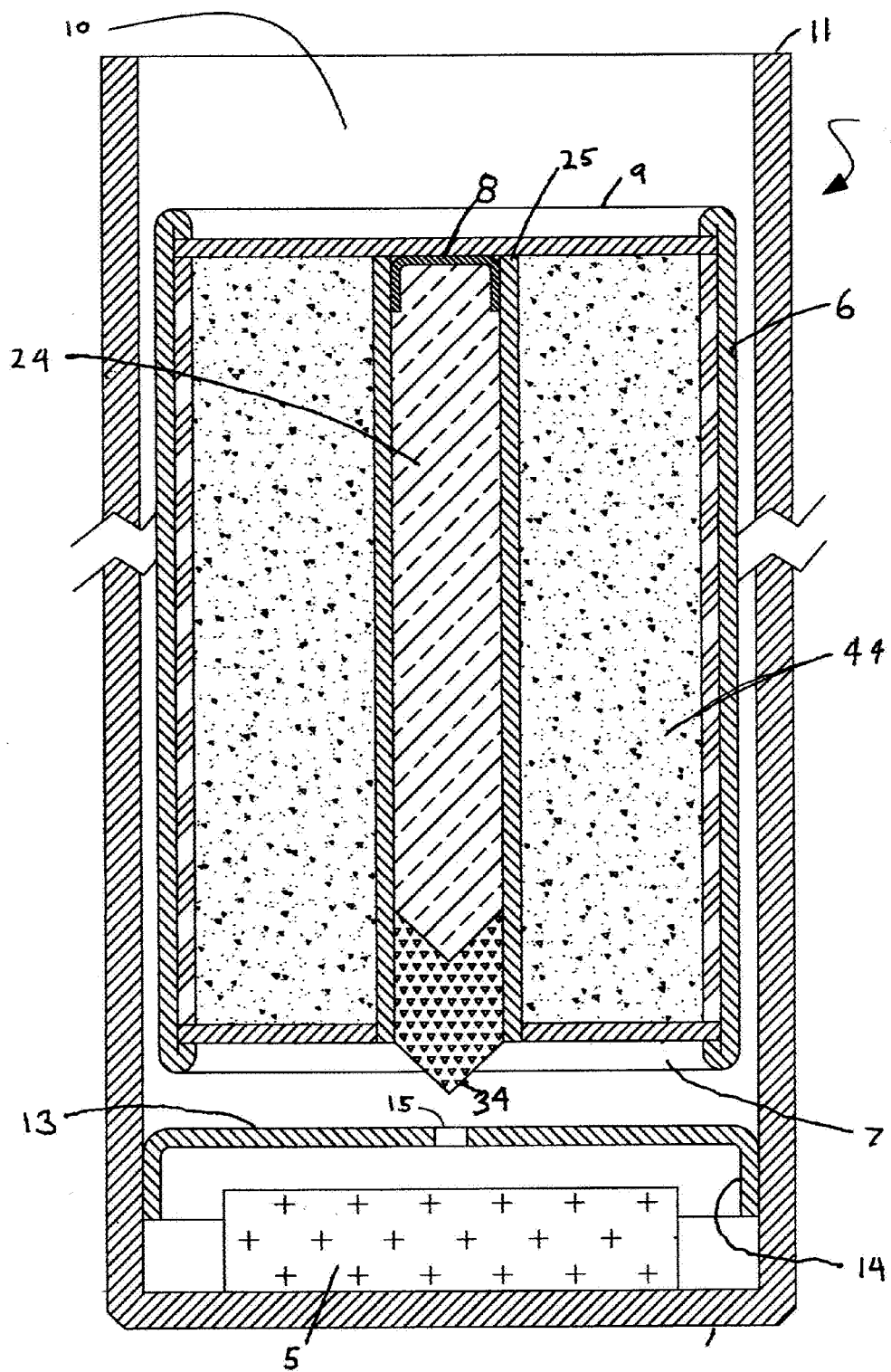
FIG. 3 is a drawing of the mortar launch tube with it's canister inside.

FIG. 2 is a cross-section drawing of the design for the mortar launch tube. This launch tube is sized to accommodate a canister containing remains. The canister can be sized to accommodate any volume of remains to be dispersed. The canister is a cylindrical cardboard tube with an approximately 0.32 cm (⅛ inch) thick outer wall [3]. FIG. 3 shows an inner cylindrical tube compartment holds the igniter [34] and an explosive burster charge compound [24]. The igniter is a delayed igniter and is pressed in place. The igniter, or pyrotechnic initiator, is made up of an energetic material often called a pyrogen, is a pyrotechnic composition made of a fuel and oxidizer, where the fuel produces a significant amount of hot particles that cause or promote the ignition of the desired material. Common oxidizers used are potassium per chlorate and potassium nitrate. Common fuels are titanium, titanium (II) hydride, zirconium, zirconium hydride and boron. The burster charge compound is an explosive. Together the igniter and burster charge compound are designed to launch the canister to an altitude of 600-1000 feet.

Further, in FIG. 3, the remains [44] are housed in the outer compartment [6]. A paint grade aluminum may be added to the remains, 10% by weight, which will produce additional sparks on detonation, if desired. The bottom of the canister [7] is an approximately 0.32 cm (⅛ inch) thick cardboard disk attached with glue. An end cap [8] fits on top of the inner burster tube [25] enclosing the igniter [34] and burster charge compound [24]. The end cap [8] is plastic and secured with an epoxy. An upper cap [9], made of 0.32 cm (⅛ inch) thick cardboard, fits over the entire canister, and is glued in place.

The mortar and canister is shown in cross-section in FIG. 3. It is cylindrical and has an approximately 10.2 cm (4 inch) bore diameter [10]. The mortar walls are approximately 0.64 cm (¼ inch) thick [11]. A fuse or squib ignition [5] is placed in the bottom of the mortar and serves as the lifting charge. An obturator disc [13] with flange sides [14], of approximately 1.22 cm (½ inch), contains a 1.22 cm (½ inch) diamater hole in the center which serves as the delay ignition hole [15]. The canister is placed inside the mortar for launch.

Upon a loved one's death, family and friends gather to discuss the departed one's interests and decide an appropriate area over which to release the remains. A family of an avid fisherman may disperse his remains over his favorite fishing hole or lake. A family may honor a loved one's love of animals by dispersing their remains over a wildlife preserve. The cremated remains then are appropriately packaged in the biodegradable container and an aerial disposal and dispersal of cremated remains device or a single mortar device is dispatched to the designated location. Family members and loved ones may participate in launching remains and holding an onsite service for the departed member. At an appointed time, the remains are loaded into one or more mortar launchers mounted on the back of a mobile unit, be it a vehicle or other mobile device, and propelled into the sky. When an appropriate altitude is reached, the explosive device is activated and explodes, causing the ashen remains to disintegrate and cover an expansive area with the ash. The loved ones may feel that the spirit of the departed lingers in that area, allowing surviving family and friends to enjoy the comfort of having a part of the loved one physically and figuratively all around them.

With a mobile unit capable of being dispatched virtually anywhere, the aerial disposal and dispersal of cremated remains device allows mourners to disperse their loved one's remains in an area special to the departed one and celebrate their departed one's interests and wishes. This is a cost effective alternative to having a loved one interred at a cemetery or mausoleum. In addition a aging or infirmed person may plan this service to be performed prior to passing relieving a burden from their loved ones.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A cremated remains device for aerial disposal and dispersal of created remains comprising a canister and a mortar, the canister being cylindrical in shape having cardboard walls for housing the cremated remains, the canister further containing an igniter and burster charge in an inner cardboard tube, the inner tube being fitted with an upper cap, the mortar being cylindrical in shape with steel walls, the mortar further comprising a lifting charge which sits below an obturator disc, the obturator disc having a hole in the center of the disc, the canister fitting inside the mortar such that the igniter sits atop the hole in the obturator disc of the mortar.

2. The cremated remains device of claim 1, further comprising the device mounted to a horizontal member.

3. The cremated remains device of claim 2 wherein the horizontal member is metal with a rubber bottom layer.

4. The cremated remains device of claim 2 wherein the horizontal member is mounted onto a bed of a truck.

5. The cremated remains device of claim 1 wherein the igniter, is a pyrotechnic composition made of a fuel and oxidizer, wherein the fuel produces a significant amount of hot particles that cause or promote the ignition of the cremated remains.

6. The created remains device of claim 5 wherein the oxidizer is potassium perchlorate or potassium nitrate.

7. The created remains device of claim 5 wherein the fuel is selected from the group consisting of titanium, titanium(II) hydride, zirconium, zirconium hydride and boron.

8. A cremated remains device for aerial disposal and dispersal of cremated remains comprising a plurality of canisters and mortars, the canisters being cylindrical in shape having cardboard walls for housing the cremated remains, the canisters further containing an igniter and burster charge in an inner cardboard tube, the inner tube being fitted with an upper cap, the mortars being cylindrical in shape with steel walls, the mortars further comprising a lifting charge which sits below an obturator disc, the obturator disc having a hole in the center, the canisters fitting inside the mortars such that the igniters sit atop the hole in the obturator disc of the mortars.

9. The cremated remains device of claim 8, wherein the plurality of canisters and mortars is four or more canisters and four or more mortars.

\* \* \* \* \*